Inventors:—
Joseph W. Myers
Robert O. Stevenson
by their Attorneys
Lawson & Lawson

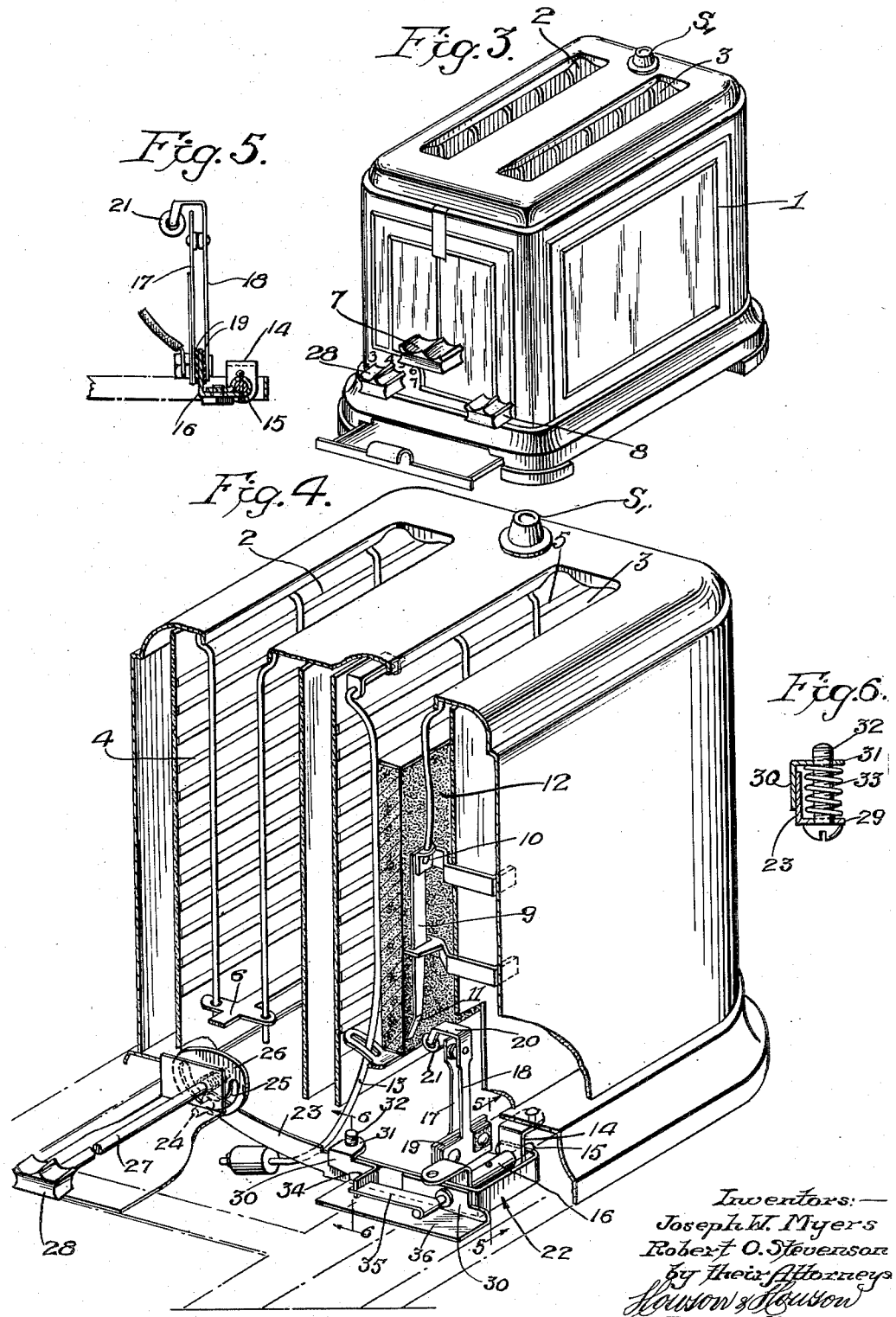

Patented Nov. 7, 1939

2,179,422

UNITED STATES PATENT OFFICE 2,179,422

COOKING APPLIANCE

Joseph W. Myers and Robert O. Stevenson, Philadelphia, Pa., assignors to Proctor & Schwartz, Inc., Philadelphia, Pa., a corporation of Pennsylvania Application August 3, 1937, Serial No. 157,204

9 Claims. (Cl. 219—19)

This invention relates to automatic toasters of the type employing a thermosensitive element which is to be directly and principally affected by a change in the surface temperature of the bread being toasted, but which is unavoidably and adversely affected to a lesser extent by the temperature of the heating elements, framework, and other surrounding parts of the toaster which derive heat from the heating elements and radiate it. It is a characteristic defect of prior toasters of this type that the bread does not toast uniformly during the warming up period starting with a cold condition of the toaster. The principal reasons for this have been determined by careful experimentation and analysis, and are found to be the following.

The relation between the surface temperature of the bread and the color or degree of toasting of the bread varies during the warming up period. Assuming a certain color or degree of toasting of the bread is desired, the surface temperature of the bread corresponding to that color will be lower when the toaster is cold than it will be when the toaster is thoroughly heated. Therefore, if the toaster is adjusted to toast the bread to the desired color when the toaster is cold, it will not toast the bread to the same color when the toaster has reached its operating temperature, or vice versa. In other words, a given bread surface temperature may be identifiable with a given bread color only when the temperature of the heating elements and the toasting well are substantially stable. Since it is desirable not to have to preheat an automatic toaster to a stable condition before use, the lack of uniformity in toast color between the first and following bread slices toasted in a toaster of this type has interfered with the sale and use of such toasters.

The relation between the surface temperature of the bread and the color or degree of toasting is dependent upon the rate or speed of the toasting operation. When the toaster is cold, the rate of toasting is slower than it is when the toaster has been heated to its proper operating temperature. As the toaster is heated from its cold condition, the rate of toasting increases and causes increase of the bread surface temperature corresponding to a particular color. When the rate of toasting becomes constant, the relation between the bread surface temperature and the desired color likewise becomes constant.

The varying influence of the heat radiated from the heating elements and heated parts of the toaster upon the bread thermostat during the warming up period also contributes to the non-uniform toasting. During the toasting of the first few bread slices, the thermostat lags behind the bread surface temperature, but as the toaster is heated the thermostat is subjected to increasing heat radiated from the heated toaster parts until the thermostat temperature leads the bread temperature. This change in relation between the thermostat temperature and the bread surface temperature naturally causes variation in the first several toasting operations.

By the present invention there is provided means for causing the toaster to shut off or stop the toasting operation at the different bread surface temperatures corresponding to a given color during the warming up period, or in other words, to control the toasting operation under the influence of the bread surface temperature in accordance with the increasing toasting ability of the toaster. Such means takes the form of a compensator which functions during the warming up period to compensate for the variation in relation between bread surface temperature and a desired bread color. The compensator also compensates for the variation in relation between the bread thermostat temperature and the bread temperature, or in other words, for the effect of the heated toaster parts upon the bread thermostat.

The principal object of the invention is, therefore to provide a novel toaster of this type embodying means for effectively compensating for the above-noted effects during the warming up period and prior to arrival of the toaster at a stable state.

A more specific object of the invention is to provide in a toaster of this type a compensating thermosensitive element which is arranged so as to be affected principally by the heat radiated by the heating elements and the toaster parts heated thereby, and which thermosensitive element is constructed and arranged to adjust the controlling switch so as to vary the movement of the main thermostat required to open the switch, in a manner to compensate for the above-noted effects during the warming up period.

Other objects and features of the invention will be apparent hereinafter.

In the accompanying drawings:

Fig. 3 is a perspective view of a toaster embodying the invention;

Fig. 4 is a sectional perspective view illustrating the mechanism provided by the invention;

Fig. 5 is a detail sectional view taken along line 5—5 of Fig. 4; and

Fig. 6 is a detail sectional view taken along line 6—6 of Fig. 4.

Figure 1:
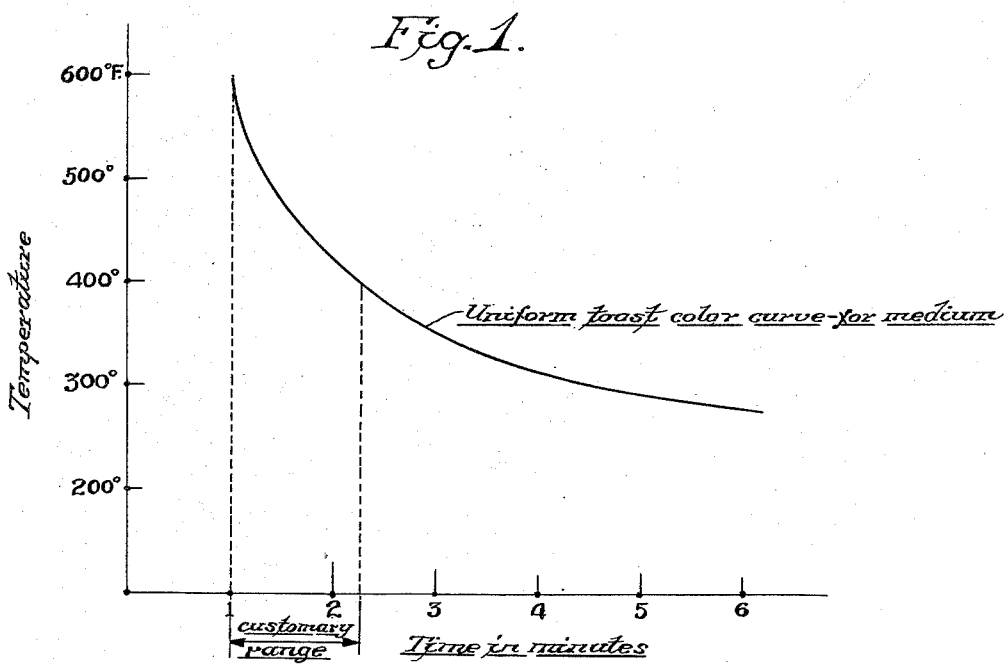
Figs. 1 and 2 are graphs or curves illustrating the operation of a toaster of the type here involved and the application of the invention thereto.

In Fig. 1, there is shown a uniform toast color curve, that is, a curve representing a desired uniform color to which each successive bread slice is to be toasted. The ordinate of this curve shows various temperatures of a thermocouple adjacent the bread surface, while the abscissa shows time in minutes. It will be seen from this curve that a longer period of time is required for the bread to reach the desired color when the toaster is "cold" than when it attains its operating temperature. It will be understood, of course, that this curve represents a particular color and that different but similar curves will represent other colors.

Figure 2:
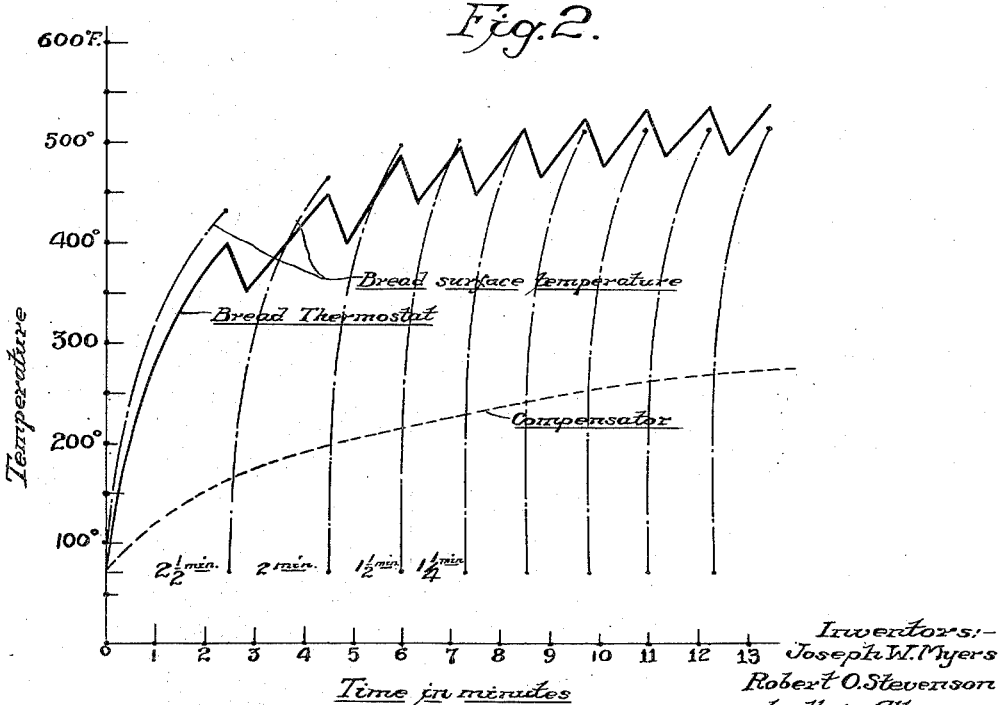

In Fig. 2, there are illustrated curves representing respectively the bread surface temperature, the bread thermostat temperature, and the temperature characteristic of the compensator provided by this invention, all of these curves being plotted against time. These curves show the various temperature characteristics for successive bread slices starting with the toaster cold. The maximum points of the family of curves (dot and dash) representing bread surface temperature indicate the bread surface temperatures at which a desired broad color is attained on successive slices. It will be seen that these temperatures increase during the warming up period until the bread surface temperature corresponding to the desired bread color becomes constant.

It will be noted also that the bread thermostat temperature (solid line saw-tooth curve) lags behind the bread surface temperature for the first several bread slices, but leads the bread surface temperature when the toaster reaches its stable condition, this action being due to the effect of the heated parts of the toaster upon the bread thermostat as above described.

It will be noted further that the rate of toasting of the bread is slow when the toaster is cold and increases as the toaster becomes heated. In other words, the time required to toast each successive bread slice decreases, as indicated by the successive time intervals. In order to compensate for the above effects, the present invention provides a compensator having the characteristic shown by the dotted curve. It will be noted that the action of the compensator bears a definite relation to that of the bread thermostat and that the action of the compensator varies during the warming up period. By virtue of the action of the compensator the successive toasting operations are interrupted when the bread surface temperature reaches the successive values corresponding to a desired uniform color during the warming up period, and after the toaster operation has become stable, the toasting operations are interrupted when the bread surface temperature reaches that constant value corresponding to the desired color. In other words, in effect the compensator stabilizes the action of the toaster during the unstable warming up period. The manner in which the compensator operates will be described later with reference to a specific mechanical embodiment.

Experiment has shown that the desired compensation above mentioned may be attained only by strict observance of certain considerations. Such compensating devices as have been proposed heretofore for use in other types of toasters have been found to be unsatisfactory for the present purpose, and when tried produced the following contradictory results:

(1) No noticeable effect at all.

(2) A small effect in the right direction.

(3) A proper compensation on the second bread slice and then increased darkening of the subsequent bread slices until they were burned.

(4) A proper compensation on the second bread slice followed by fading of the toast on subsequent bread slices.

(5) Proper compensation at one color of the toast but not at other colors.

For the present purpose, a compensator may be defined as an apparently reversed cooperating thermostat that lags behind the thermostat being compensated, during the initial heating toward a stable temperature, by the amount of compensation desired, which may be less, equal to or greater than the actual lag of the thermostat being compensated. In the present instance, the compensator lags more than the true lag of the main thermostat behind its surroundings. Since lag is entirely a time function, a proper compensator depends primarily on timing of the heating rate and secondarily on the proper amount of movement resulting in response to the proper heating rate. Certain factors which must be taken into consideration in order to attain the desired compensation in a toaster of the type here involved are as follows:

(1) When the temperature of the compensator is a rectilinear function of the bread thermostat, no compensation at all is produced.

(2) Should the compensator not lag sufficiently in its rate of heating, it will not produce sufficient compensation at any time, while if its activity is increased, i. e., if its length is increased to secure greater movement, proper compensaton on the second bread slice may result with over compensation on the following bread slices.

(3) Should the compensator lag too much, it will not produce the desired compensation on the second bread slice and will tend to over compensate on the following bread slices.

(4) It has been found that unless bimetal having a substantially rectilinear deflection with temperature is employed in the bread thermostat, it is practically impossible to construct a compensating thermostat to operate with it. Since the bimetal previously used for the bread control in toasters of this type was not rectilinear in its movement with temperature in the toasting range, this difficulty had to be surmounted. It has been found that if a bread thermostat is employed having a non-linear temperature-to-movement characteristic, a compensator will gain on it at darker toast settings.

(5) The mass and associated heat conductive connection and nearby radiating surfaces related to the compensator thermostat must be such that its rate of heating is initially substantially delayed compared with the rate of heating of the bread-sensitive thermostat, yet the rate of heating of the compensator, compared with the bread thermostat, must increase as time elapses until it becomes substantially the same as the bread element at the time the toaster has attained its maximum temperature or toasting speed. Thus both the bread-sensitive element and the compensator element approach their maximum deflection at about the same time, although the compensator has a slow start.

A physical embodiment of a toaster of the type here involved, employing a compensator according to the invention, is shown in Figs. 3 to 6. Referring to these figures, there is illustrated a toaster of the two-slice type comprising a body 1 having recesses or wells 2 and 3 adapted to receive the bread slices, as well understood. Within the wells 2 and 3, there are provided the usual electrical heating elements 4 and 5 which are adapted to surface cook or toast the bread slices. In this particular type of toaster, the bread slices are carried by a vertically movable carriage 6 which is adapted to be moved to its lowermost position by a knob 7, there being provided means (not visible) for urging the carriage to its upper position and a latching mechanism for holding the carriage in its lower position. The latching mechanism is releasable by means of a knob 8. This general structure of the particular toaster illustrated is conventional and forms no part of the present invention. It is, therefore, unnecessary to describe such structure in greater detail.

Referring now to Fig. 4, there is provided within the recess or well 3 a downwardly-extending thermostatic strip or element 9 which is fixed at its upper end at 10 and the lower end 11 of which is free and capable of moving in response to flexing of the thermostatic element under the influence of heat. This thermostatic strip is formed of bimetal having a rectilinear temperature-to-movement characteristic as above mentioned. This element is disposed as illustrated so that it is adapted to be affected by the surface temperature of a piece of bread 12, but it is also affected by the heat radiated from the heating elements and the parts of the toaster heated thereby. A weighted arm 13 is adapted to press the bread into proper relation with the thermostatic element.

Within the base of the toaster, there is provided a bracket or support 14 which carries a rotatable shaft 15 to which there is secured a switch support 16 carrying a pair of switch arms 17 and 18 insulated from one another by means of insulating sheets of mica 19. At their upper ends, the switch arms 17 and 18 carry contact buttons which are normally in engagement with one another. The upper end of the switch arm 18 has an extension 20 bent around the end of the switch arm 17 and carrying a roller 21 formed of insulating material. The roller 21 is adapted to be engaged by the end 11 of the thermostatic element 9 when the thermostatic element flexes under the influence of heat. In this manner, the upper end of the switch arm 18 is moved so as to separate the contact buttons and thus open the switch. The switch is included in the electrical circuit of the appliance so as to control the operation thereof, and there is also included in the circuit a signal device S which gives a visible indication when the switch opens.

An L-shaped bracket 22 is loosely mounted on the ends of shaft 15, and the longer arm 23 of this bracket carries at its end a pin 24 which rides within a cam slot 25 in the cam 26. The cam 26 is carried upon the end of a rotatable shaft 27 having an operating knob 28 disposed externally of the toaster, as shown in Fig. 3. The knob 28 is adapted to be adjusted to various rotary positions to manually adjust the thermostatic control device, as described more particularly hereinafter.

Intermediate its ends, the arm 23 is provided with an ear or tab 29 (see Fig. 6), the purpose of which will appear presently. An arm or bracket 30 is loosely mounted on an end of shaft 15 adjacent the arm 23. The arm 30 is also provided with an extending ear or tab 31 which aligns with the ear 29 on arm 23, as shown clearly in Fig. 6. The two ears 29 and 31 are apertured to receive a screw 32, the aperture in the ear 31 being threaded to threadedly receive the threaded end of the screw. A coil spring 33 encircles the shank of the screw and is disposed between the ears 29 and 31. In this manner, the arms 23 and 30 are operatively and adjustably connected together for a purpose which will appear presently.

The bracket or arm 30 has a turned-out lug 34 which is slotted to receive an end of a bimetallic thermostatic strip 35, the other end of which is curled around the end of shaft 15 and secured thereto. This element constitutes the auxiliary or compensating thermostatic element above mentioned. It will be noted that this compensating thermostat is positioned so that it is affected principally by the heat radiated from the heating elements and the toaster parts heated thereby, and therefore the movement of this thermostat is a function of the toasting speed of the toaster. In other words, the compensator is located in a zone of lower temperatures compared to the zone in which the bread thermostat is located, and the said temperatures are a function of the toasting speed of the toaster. This compensator is designed so as to have the heat response characteristic illustrated in Fig. 2 and described above. Its movement is caused to substantially neutralize the movement of the bread thermostat caused by the change in toasting ability of the toasted, thus causing the switch 17, 18 to be affected by the bread thermostat in response to significant changes in the surface temperature of the bread. It also serves as an operating part of the manual adjustment mechanism for the main thermostatic control device, as will be described in greater detail. An extension or apron 36 on arm 30 serves to reflect heat toward the thermostatic element 35 and to protect it from cooling air currents coming up through the bottom of the toaster.

It will be seen that the thermostatic strip 35 constitutes a lever arm, one end of which is secured to the shaft 15 and the other end of which is movable by the arm or bracket 30. When the arm 23 is adjusted by means of the cam shaft 27 and the manually operable knob 28, the arm 30 is actuated through the interconnection thereof with arm 23 by the elements 29 and 31. The actuation of arm 30 about shaft 15 as a pivot rotates the thermostatic element 35 as a lever arm, thus rotating shaft 15 and moving the switch 17, 18 as a unit relative to the end 11 of the thermostatic element 9. Since the position of the switch relative to the end 11 determines the amount of movement of end 11 necessary to open the switch, it will be apparent that this manual adjustment of the switch determines the degree of toasting or color of the piece of bread 12. By adjusting the screw 32, the position of arm 30 may be adjusted relative to the arm 23 which, in turn, adjusts the position of the switch 17, 18 relative to its operating mechanism. In this manner, the mechanism may itself be adjusted to give any desired operation of the switch within a predetermined range. It will be understood, of course, that the adjustment by means of the screw 32 will normally be made at the factory or by a service man.

Assuming a certain manual adjustment of the main thermostatic control device to give a desider degree of toasting or color of the bread, were it not for the compensating thermostat, successive bread slices would not be toasted uniformly to the desired temperature, owing to the above-described effects which are characteristic of a toaster of this type. As the toaster warms up, however, the auxiliary thermostatic element 35 responds to the increase in temperature of the toaster which is a function of the toasting speed, and since the two ends of the element 35 are secured, the intermediate or central portion of the said element will flex or bend. This causes slight rotation of the shaft 15 in a clockwise direction as viewed in Fig. 4, thus moving the switch 17, 18 away from the end 11 of the main thermostat 9. Therefore, after the toaster has warmed up, the end 11 is required to move through a greater distance to open the switch 18. The parts are so designed and arranged that the movement of the switch 17, 18 which is thus effected, substantially compensates for the above-described effects during the warming up period, causing the switch to be opened by the bread thermostat at the proper bread surface temperature corresponding to the desired color for each successive bread slice. As a result, successive pieces of bread are toasted to the same degree or color. Thus, for any given manual adjustment of the thermostatic control device, the compensating thermostat 35 automatically adjusts the thermostatically-controlled switch 17, 18 so as to effect the desired compensation.

It will be seen from the above description that the auxiliary thermostat 35 is caused to serve a dual purpose, viz. as as operative part of the manual adjustment for the thermostatic control device and also as an automatic compensating thermostat serving to automatically adjust the thermostatically-controlled switch in relation to the instability of the toaster during the warming up period.

Although the invention has been illustrated and described in its application to a specific form of toaster, it will be understood that it is not thus limited but is capable of use in any toaster of the type here involved. It will be understood also that various changes and modifications may be made without departing from the scope of the invention as defined in the appended claims.

What is claimed is:

1. An automatic bread toaster adapted to toast successive slices of bread to any selected degree or color within the range of operation of the toaster, comprising electrical heating means within the body of the toaster, means within the body of the toaster for supporting a bread slice in cooperative relation with said heating means, a thermomotive element mounted outside the surface of the bread slice being toasted and within the toasting zone where it will be significantly affected by the surface temperature of the bread being toasted and the heat radiated from said heating means, switch-controlled signaling means for indicating the completion of the toasting operation, including a switch operable by said thermomotive element when the element has moved sufficiently, a second thermomotive element located in a zone of lower temperature where it is affected principally by temperatures which are a function of the toasting speed of the toaster, and means for causing the movement of said second element to substantially compensate for the effect upon said first element caused by the change in toasting ability of said heating means, thus causing said switch to be significantly affected by said first element in response to significant changes in the surface temperature of the bread being toasted.

2. In an automatic bread toaster adapted to toast successive slices of bread to any selected degree or color within the range of operation of the toaster, comprising electrical heating means within the body of the toaster, means within the body of the toaster for supporting a bread slice in cooperative relation with said heating means, a thermomotive element mounted outside the surface of the bread slice being toasted and within the toasting zone where it will be significantly affected by the surface temperature of the bread being toasted and the heat radiated from said heating means, switch-controlled signaling means for indicating the completion of the toasting operation, including a switch operable by said thermomotive element when the element has moved sufficiently, a second thermomotive element located in a zone of lower temperature where it is affected principally by temperatures which are a function of the toasting speed of the toaster, and means operable by said second element for varying the position of said switch relative to said first element in correspondence to the change in toasting ability of said heating means, thus substantially neutralizing the effect of said change upon said first element and causing said switch to be significantly affected by said first element in response to signficant changes in the surface temperature of the bread being toasted.

3. An automatic bread toaster adapted to toast successive slices of bread to any selected degree or color within the range of operation of the toaster, comprising electrical heating means within the body of the toaster, means within the body of the toaster for supporting a bread slice in cooperative relation with said heating means, a thermomotive element mounted outside the surface of the bread slice being toasted and within the toasting zone where it will be significantly affected by the surface temperature of the bread being toasted and the heat radiated from said heating means, a switch for controlling said heating means comprising a pair of switch contacts, a common pivotal support for said contacts serving to support the contacts in cooperative relation with said element, one of said contacts being actuatable by said element to open the contacts when said element moves sufficiently in response to the heat affecting it, a second thermomotive element located in a zone of lower temperature where it is affected principally by temperatures which are a function of the toasting speed of the toaster, and means including said second element for varying the position of said switch relative to said first element in correspondence to the change in toasting ability of said heating means, thus substantially neutralizing the effect of said change upon said first element and causing said switch to be significantly affected by said first element in response to significant changes in the surface temperature of the bread being toasted.

4. An automatic bread toaster adapted to toast successive slices of bread to any selected degree or color within the range of operation of the toaster, comprising electrical heating means within the body of the toaster, means within the body of the toaster for supporting a bread slice in cooperative relation with said heating means, a thermomotive element mounted outside the surface of the bread slice being toasted and within the toasting zone where it will be significantly affected by the surface temperature of the bread being toasted and the heat radiated from said heating means, a switch for controlling said heating means, said switch being actuatable by said element when the latter moves sufficiently in response to the heat affecting it, manually-operable means for adjusting the position of said switch relative to said element to affect toasting of the bread to a desired color, a second thermomotive element located in a zone of lower temperature where it is affected principally by temperatures which are a function of the toasting speed of the toaster, and means including said second element for varying the position of said switch relative to said first element in correspondence to the change in toasting ability of said heating means, thus substantially neutralizing the effect of said change upon said first element and causing said switch to be significantly affected by said first element in response to significant changes in the surface temperature of the bread being toasted.

5. An automatic bread toaster adapted to toast successive slices of bread to any selected degree or color within the range of operation of the toaster, comprising electrical heating means within the body of the toaster, means within the body of the toaster for supporting a bread slice in cooperative relation with said heating means, a thermomotive element mounted outside the surface of the bread slice being toasted and within the toasting zone where it will be significantly affected by the surface temperature of the bread being toasted and the heat radiated from said heating means, a switch for controlling said heating means, said switch being actuatable by said element when the latter moves sufficiently in response to the heat affecting it, a rotatable shaft carrying said switch, a manually-operable lever arm rotatably supported by said shaft, and a second thermomotive element connected between said shaft and said arm and located in a zone of lower temperature where it is affected principally by temperatures which are a function of the toasting speed of the toaster, whereby said second element varies the position of said switch relative to said first element to thereby substantially neutralize the effect of the change in toasting ability of said heating means upon said first element, thus causing said switch to be significantly affected by said first element in response to significant changes in the surface temperature of the bread being toasted.

6. An automatic bread toaster adapted to toast successive slices of bread to any selected degree or color within the range of operation of the toaster, comprising electrical heating means within the body of the toaster, means within the body of the toaster for supporting a bread slice in cooperative relation with said heating means, a thermomotive element mounted outside the surface of the bread slice being toasted and within the toasting zone where it will be significantly affected by the surface temperature of the bread being toasted and the heat radiated from said heating means, a switch for controlling said heating means, said switch being arranged for operation by said thermomotive element when the element has moved sufficiently, a second thermomotive element located in a zone of lower temperature where it is affected principally by temperatures which are a function of the toasting speed of the toaster, and means for causing the movement of said second element to substantially compensate for the effect upon said first element caused by the change in toasting ability of said heating means, thus causing said switch to be significantly affected by said first element in response to significant changes in the surface temperature of the bread being toasted.

7. An automatic bread toaster adapted to toast successive slices of bread to any selected degree or color within the range of operation of the toaster, comprising electrical heating means within the body of the toaster, means within the body of the toaster for supporting a bread slice in cooperative relation with said heating means, a thermomotive element mounted outside the surface of the bread slice being toasted and within the toasting zone where it will be significantly affected by the surface temperature of the bread being toasted but adversely affected by the change in toasting ability of said heating means, signaling means for indicating the completion of the toasting operation, operable by said thermomotive element when the element has moved sufficiently, a second thermomotive element located outside the toasting zone and relatively remote from the bread slice where it is affected principally by temperatures which are a function of the toasting speed of the toaster, and means for causing the movement of said second element to substantially compensate for the effect upon said first element caused by the change in toasting ability of said heating means, thus causing said signaling means to be significantly affected by said first element in response to significant changes in the surface temperature of the bread being toasted.

8. An automatic bread toaster adapted to toast successive slices of bread to any selected degree or color within the range of operation of the toaster, comprising electrical heating means within the body of the toaster, means within the body of the toaster for supporting a bread slice in cooperative relation with said heating means, a thermomotive element mounted outside the surface of the bread slice being toasted and within the toasting zone where it will be significantly affected by the surface temperature of the bread being toasted and the heat radiated from said heating means, switch-controlled signaling means for indicating the completion of the toasting operation, including a switch operable by said thermomotive element when the element has moved sufficiently, a second thermomotive element located in a zone of lower temperature where it is affected principally by temperatures which are a function of the toasting speed of the toaster, said thermostatic elements each being constructed and arranged to have substantially uniform deflection per unit temperature change and said elements having such mass that they arrive at a stable temperature at substantially the same time, and means for causing the movement of said second element to substantially compensate for the effect upon said first element caused by the change in toasting ability of said heating means, thus causing said switch to be significantly affected by said first element in response to significant changes in the surface temperature of the bread being toasted.

9. An automatic bread toaster adapted to toast successive slices of bread to any selected degree or color within the range of operation of the toaster, comprising electrical heating means within the body of the toaster, means within the body of the toaster for supporting a bread slice in cooperative relation with said heating means, a thermomotive element mounted outside the surface of the bread slice being toasted and within the toasting zone where it will be significantly affected by the surface temperature of the bread being toasted but adversely affected by the change in toasting ability of said heating means, means for controlling the toasting operation operable by said thermomotive element when the element has moved sufficiently, a second thermomotive element located outside the toasting zone and relatively remote from the bread slice where it is affected principally by temperatures which are a function of the toasting speed of the toaster, and means for causing the movement of said second element to substantially compensate for the effect upon said first element caused by the change in toasting ability of said heating means, thus causing said controlling means to be significantly affected by said first element in response to significant changes in the surface temperature of the bread being toasted.

JOSEPH W. MYERS.
ROBERT O. STEVENSON.